July 18, 1939.  H. R. BATES  2,166,483
AUTOMOBILE BUMPER
Filed June 20, 1938  2 Sheets-Sheet 1
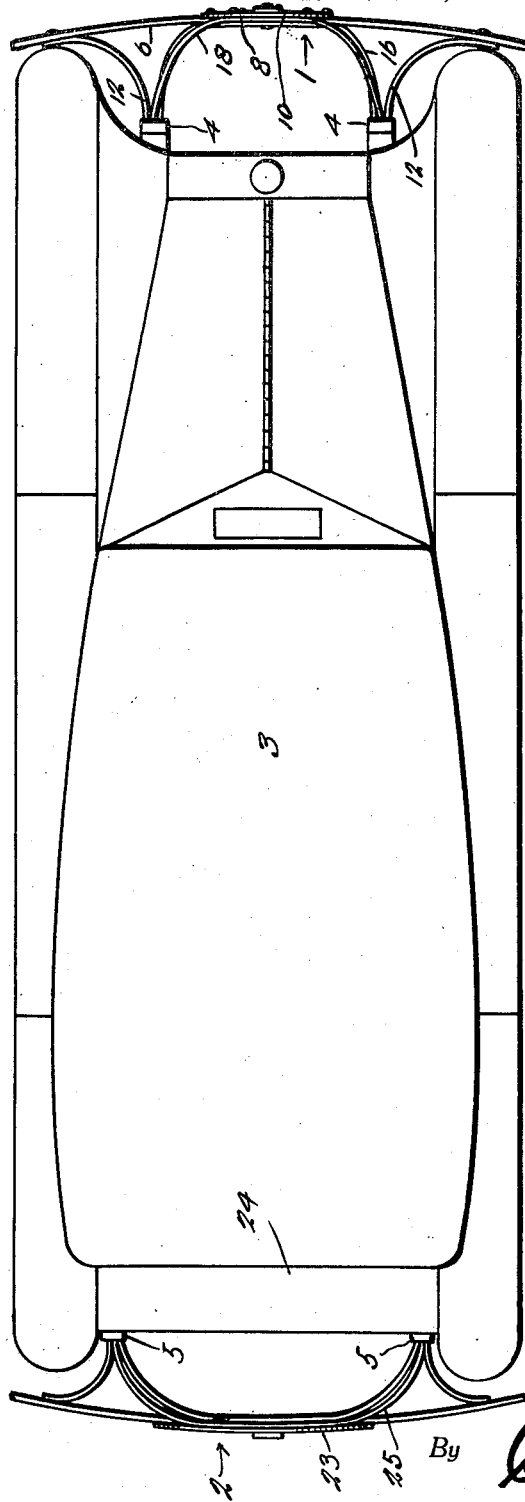
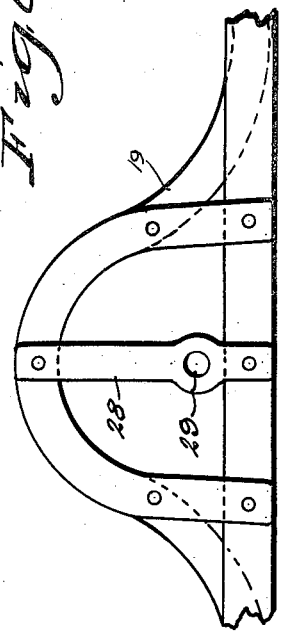
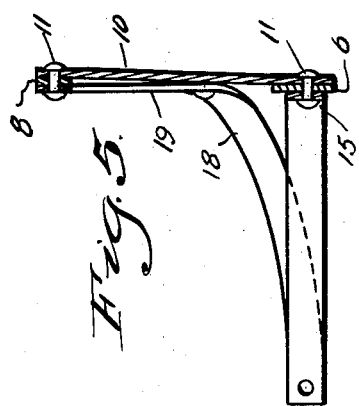
Inventor
Hampton R. Bates
By Clarence A. O'Brien
and Hyman Berman
Attorneys

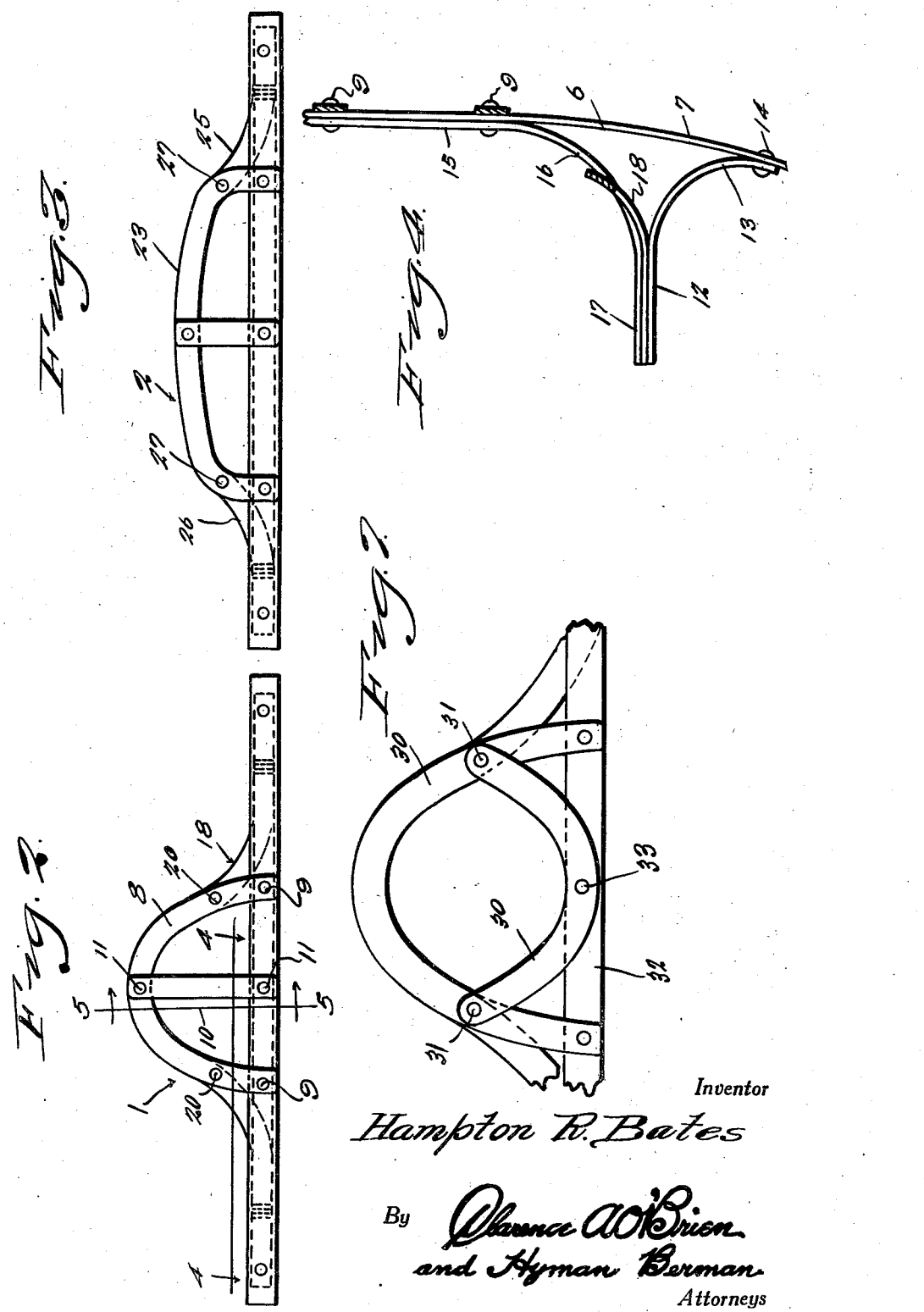
July 18, 1939. H. R. BATES 2,166,483
AUTOMOBILE BUMPER
Filed June 20, 1938  2 Sheets-Sheet 2
Inventor
Hampton R. Bates
By Clarence A. O'Brien
and Hyman Berman
Attorneys Patented July 18, 1939

2,166,483

UNITED STATES PATENT OFFICE 2,166,483

AUTOMOBILE BUMPER

Hampton R. Bates, Roanoke, Va.

Application June 20, 1938, Serial No. 214,825

1 Claim. (Cl. 293—55)

My invention relates to improvements in bumpers for automobiles, the particular object in view being to provide an inexpensive resilient bumper reinforced so as to withstand heavy impacts against the same and equipped to protect the prominent radiator grills and built-in rear trunks of present day motor cars.

Other and subordinate objects, together with the precise nature of my improvement will become apparent when the succeeding description and appended claim are read with reference to the drawings accompanying and forming part of this specification.

In said drawings:

Figure 1 is a view in top plan of an automobile equipped with my improved bumpers, Figure 2 is a view in front elevation of the front bumper, Figure 3 is a view in rear elevation of the rear bumper, Figure 4 is a fragmentary view partly in top plan and partly in horizontal section taken on the line 4—4 of Figure 2 looking downwardly as indicated by the arrows, Figure 5 is a view in vertical transverse section taken on the line 5—5 of Figure 2 looking in the direction indicated by the arrows and drawn to an enlarged scale, Figure 6 is a fragmentary view in front elevation of a modified form of front bumper, and Figure 7 is a similar view of another modified form of front bumper.

Referring to the drawings by numerals, my invention comprehends a front bumper 1 and a rear bumper 2 which are substantially identical in construction, with the exceptions presently noted, and which are attached to the automobile 3 by means of the usual front and rear pairs of clamps 4 and 5 illustrated generally in Figure 1.

The front bumper 1 comprises a front bumper bar 6, flat and of resilient steel, the ends of which may be rearwardly curved in the usual manner as indicated at 7. In the transverse center of the front bumper bar 6 is an upstanding radiator grill guard of general horseshoe shape, and also of flat resilient steel, said guard 8 having its ends riveted to the front face of the bumper bar 6 as at 9 to form an arch extending well above said bumper bar 6. A guard bracing bar 10 extends from the center of the guard 8 to the bumper bar 6 with its opposite ends bolted to said guard and bar as at 11. The bumper bar 6 is carried by a pair of side bars 12 of the same material as said bar 6 which have outwardly curved ends 13 secured to the opposite ends of said bumper bar 6 as by bolts 14. In the rear of the bumper bar 6 is a brace bar 15 secured to said bar 6 by the aforementioned bolts 9 and having opposite ends curving rearwardly as at 16 and terminals 17 disposed parallel with the rear ends of the side bars 12. In addition to the described parts the front bumper 1 includes a guard bracing bar 18 also of flat resilient metal having a central upwardly bowed part 19 conforming in contour to the upper part of the guard 8 and bolted, as at 20, flat against the rear side of said guard, said bar 18 being bent or curved rearwardly from opposite sides of the guard 8 and having its terminals interposed between the rear ends of the side bars 12 and the terminals 16 of the said bar 16, as best shown in Figure 4. As will be clear from said figure, the terminals of the said bars 12, 16 and 18 are disposed close together for engagement by the clamps 4.

The rear bumper 2 is constructed in the same manner as described with reference to the front bumper 1, with the exception that in lieu of the horseshoe-shaped guard 8 a bow-shaped guard 23 is utilized and which is longer to adequately protect the built-in trunk 24 of the automobile 3. The guard bracing bar 25 corresponding to the bar 18 of the front bumper 1 is upwardly bowed as indicated at 26 in conformity with the shape of the upper part of the guard 23 to which it is secured flat by the bolts 27 just as in the case of the guard bracing bar 18.

In the modified form of the invention shown in Figure 6, a central guard bracing bar 28 similar to bar 10, is provided with an aperture 29 therein for the insertion of a crank therethrough to facilitate cranking of the engine of the automobile.

In the modification of the invention shown in Figure 7, the guard 30 of the front bumper is braced by a downwardly arched bar 31 of flat spring metal secured at its opposite ends to said guard as by bolts 31 and intermediate its ends to the front bumper bar 32 by a rivet 33. By providing the form of brace bar 30 a license tag, not shown, may be attached to the back of the guard 30 to be visible therethrough.

As will now be seen, I have provided a bumper which is strongly reinforced throughout its length so as to withstand heavy impact against the same and which is provided with a reinforced guard adequately protecting the grill of the radiator, in the case of the front bumper, and the trunk and rear of the body of the automobile in the case of the rear bumper. As will also be evident, the bumper of my invention is doubly reinforced adjacent its ends, or in other words, its points of heaviest duty, and is simple in construction and therefore economical to manufacture.

The foregoing will, it is believed, suffice to impart a clear understanding of my invention without further explanation.

Manifestly, the invention is susceptible of modification in other respects, than as described, and right is herein reserved to such modifications as fall within the scope of the subjoined claim.

What I claim is:

A bumper for attachment to the chassis of an automobile comprising a front single piece bumper bar, a pair of side arms for supporting opposite ends of the bumper bar comprising straight rear ends for attachment to said chassis and outwardly curving front ends secured to the ends of the bumper bar, an upwardly arched guard of horse-shoe form in the transverse center of the bumper bar extending therefrom well above the same and having free ends attached to said bar inwardly of the ends of the latter, a vertically disposed guard reinforcing brace extending between the bumper bar and the top of said guard and attached to the same, a reinforcing bar in the rear of said bumper bar having a central upwardly arched portion fitting flat against the rear side of said guard and attached thereto, said reinforcing bar curving downwardly and rearwardly from said guard and terminating in straight ends opposed flat against the ends of said arms parallel therewith for attachment to said chassis, and a second reinforcing bar extending along the rear side of the bumper bar parallel therewith, said second bar curving rearwardly from the bumper bar and terminating in straight ends opposed flat against the ends of the first-mentioned reinforcing bar for attachment to said chassis.

HAMPTON R. BATES.